US011358246B2

(12) United States Patent
Bohle, II (10) Patent No.: US 11,358,246 B2
(45) Date of Patent: Jun. 14, 2022

(54) TOOL BIT CHANGING SYSTEM

(71) Applicant: ATI Industrial Automation, Inc., Apex, NC (US)

(72) Inventor: David John Bohle, II, Durham, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 202 days.

(21) Appl. No.: 16/515,312

(22) Filed: Jul. 18, 2019

(65) Prior Publication Data

US 2021/0016401 A1   Jan. 21, 2021

(51) Int. Cl.
*B23Q 3/157* (2006.01)
*B23Q 3/155* (2006.01)

(52) U.S. Cl.
CPC ..... *B23Q 3/15706* (2013.01); *B23Q 3/15536* (2016.11); *B23Q 2003/15527* (2016.11); *Y10T 483/1793* (2015.01); *Y10T 483/1809* (2015.01)

(58) Field of Classification Search
CPC ......... Y10T 483/1809; Y10T 483/1793; Y10T 483/179; Y10T 279/1291; B23Q 2003/15527; B23Q 3/15553; B23Q 3/15706; B25J 15/0491; B25J 15/0416; B23B 31/1071; B23B 31/22; B23B 31/263; B23B 31/1078; B23B 31/107; Y10S 279/17752
USPC .......... 483/59, 55, 54; 279/4.12, 75
See application file for complete search history.

(56) References Cited

U.S. PATENT DOCUMENTS

| 2,188,205 A | | 1/1940 | Osborne | |
| 2,189,002 A | | 2/1940 | Hammer | |
| 2,468,396 A | | 4/1949 | Frisco | |
| 2,475,385 A | | 7/1949 | Frisco | |
| 3,674,281 A | * | 7/1972 | Hedrick | B23B 31/22 279/30 |
| 3,775,837 A | * | 12/1973 | Tomita | B23Q 3/15773 483/59 |
| 4,818,157 A | | 4/1989 | Kouvelis | |
| 5,735,651 A | * | 4/1998 | Harroun | B23B 31/263 408/240 |

(Continued)

FOREIGN PATENT DOCUMENTS

| DE | 809878 C | | 8/1951 |
| JP | 60-056841 A | * | 4/1985 |
| JP | 2010-240808 A | * | 10/2010 |

OTHER PUBLICATIONS

Vargus, "SHAVIV Tools, Industrial Deburring Solutions, Holders", Retrieved from the internet: URL: https://www.vargus.com/industrial-holders [retrieved on Jun. 27, 2019]; pp. 1-2.

(Continued)

*Primary Examiner* — Erica E Cadugan
(74) *Attorney, Agent, or Firm* — Coats & Bennett, PLLC (57) ABSTRACT

A tool changing system that includes a tool mount adapter and a tool holder. The tool mount adapter is configured to be attached to a tool and selectively engage and disengage a tool bit. The tool provides movement to the engaged tool bit to perform work on a workpiece. The tool holder is positioned in proximity to hold the tool bit when the tool bit is not engaged by the tool. The tool holder can also selectively engage and disengage the tool bit.

20 Claims, 8 Drawing Sheets

(56) References Cited

U.S. PATENT DOCUMENTS

| | | | | |
|---|---|---|---|---|
| 6,003,416 A | * | 12/1999 | Ando | B23B 31/1071 |
| | | | | 279/103 |
| 6,302,408 B1 | | 10/2001 | Zierpka | |
| 6,755,424 B1 | | 6/2004 | Paulsen | |
| 2002/0134203 A1 | | 9/2002 | Dvir | |
| 2013/0085049 A1 | * | 4/2013 | Zeng | B23Q 3/15706 |
| | | | | 483/59 |
| 2019/0084056 A1 | | 3/2019 | Sweet et al. | |

OTHER PUBLICATIONS

NOGA Engineering & Technology Ltd, "S Holder—EL02003", Retrieved from the internet: URL: https://www.noga.com/Products/hd32/Heavy%20Duty%203.2mm%20Swivel%20blade/EL02003/S_Holder_-_EL02003 [retrieved on Jun. 27, 2019]; pp. 1-4.

* cited by examiner

TOOL BIT CHANGING SYSTEM

FIELD OF INVENTION

The present invention relates generally to a tool bit changing system to change a tool bit in a tool and, more particularly, to a tool bit changing system with a tool mount adapter and a tool holder each configured to engage and disengage with the tool bit.

BACKGROUND

Robotic devices such as industrial robots and related automated equipment are equipped to connect with tools to perform a variety of different work functions. The tools include tool bits such as but not limited to cutting blades, drill bits, deburring blades, and brushes. During the course of a work period or a work project, multiple different tool bits may be attached to the tool. This is necessary to replace tool bits that have worn out or become dull, or to allow the tool to perform different tasks such as performing a cutting task with a first tool bit and a deburring task with a second tool bit.

Current tools are designed for manual replacement of the tool bits. Each tool includes a rod with a receptacle that receives the tool bit. A collet is positioned along the rod and is biased outward to engage with the tool bit. Changing the tool bit requires that the collet be moved along the rod against the applied biasing force to an unlocked position. While unlocked, the tool bit can be removed and replaced. Once replaced, the collet can be released to engage with the new tool bit.

The manual replacement of tool bits causes a number of disadvantages. First, the manual replacement is time consuming. Each of the various steps (e.g., grasping the tool, moving the collet, removing the old tool bit, inserting a new tool bit, releasing the collet, and returning the tool to the desired position) takes time resulting in an overall extended time period to replace the tool bit. Another disadvantage is that the robotic device may need to be powered down while the user is changing the tool bit. This can be a safety precaution that is required of the robotic device at times when a user is within a predetermined work envelope. This prevents the robotic device from accidentally contacting the user while they are working with the tools. Once the user has finished and has left the work envelope, the robotic device can be re-energized. Prior to performing any work functions, the robotic device may need to process an initialization sequence. Again, this power-down, power-up, and initialization sequence can take time thus reducing the efficiency of the work performance.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

One aspect is directed to a tool changing system for use with a robotically operated tool that includes a rod with an open end that receives a tool bit. The tool changing system comprises a tool mount adapter with a housing; a first piston movably connected to the housing; a first cavity within the housing; and a channel that extends through the first piston and is sized to receive the rod with the channel comprising a tapered section with a tapered width that extends along the rod. A tool holder comprises: a body with a receptacle; a second piston movably mounted to the body; and a second cavity at the body. Each of the first and second cavities comprises a first port and a second port. Each of the tool mount adapter and the tool holder are configured to move between a locked position to lock to the tool bit when fluid is introduced through the first port and an unlocked position to unlock from the tool bit when fluid is introduced through the second port.

In another aspect, a control unit with a processing circuit is configured to move the tool mount adapter and the tool holder between the locked and unlocked positions with the control unit further configured to position at least one of the tool mount adapter and the tool holder in the locked position at all times.

In another aspect, the first piston comprises an annular shape configured to extend around the rod.

In another aspect, the first piston comprises a flange that is positioned within the housing and a neck that extends through the opening in the housing with the tapered section positioned along the neck.

In another aspect, the first piston is movable relative to the housing between the locked position with the flange of the first piston positioned in closer proximity to the first port and the unlocked position with the flange positioned in closer proximity to the second port, and with the flange remaining between the first and second ports of the housing in both of the locked and unlocked positions.

One aspect is directed to a tool changing system for use with a robotically operated tool that includes a rod with an open end that receives a tool bit. The tool changing system comprises an annular tool mount adapter with an open interior that receives the rod. The tool mount adapter comprises: a housing with a central opening that receives the rod and with the housing further comprising first and second ports; and a first piston movably connected to the housing. The first piston comprises: a body that extends through the central opening with the body comprising a flange at a first end that is positioned within the housing and a second end positioned outward away from the housing; a channel that extends through the body and is sized to receive the rod with the channel comprising a tapered section with a tapered width; the first piston movable along the rod and relative to the housing between locked and unlocked positions. A tool holder comprises: a receptacle; and a second piston that is movable relative to the receptacle between a locked position and an unlocked position.

In another aspect, first and second ports are within each of the tool mount adapter and the tool holder with each of the tool mount adapter and the tool holder being in the locked position to engage with a tool bit when fluid is introduced through the first port and in the unlocked position to release the tool bit when fluid is introduced through the second port.

In another aspect, a cavity is formed within the housing with each of the first and second ports extending through the housing and into the cavity, and the first piston being movable relative to the housing with the flange remaining positioned between the first and second ports.

In another aspect, a control unit with a processing circuit is configured to move the tool mount adapter and the tool holder between the locked and unlocked positions with the control unit further configured to position at least one of the tool mount adapter and the tool holder in the locked position at all times.

One aspect is directed to a method of changing a tool bit from a robotically operated tool with the method comprising: introducing fluid into a first section of a tool mount adapter and locking the tool bit to the tool; moving the tool mount adapter and the tool bit to a tool holder and inserting the tool bit into the tool holder while the tool bit remains locked by the tool mount adapter; while the tool bit is inserted into the tool holder, introducing fluid into the tool holder and locking the tool bit to the tool holder; and introducing fluid into a second section of the tool mount adapter and unlocking the tool bit from the tool mount adapter while the tool bit is inserted into the tool holder.

In another aspect, the method also includes locking the tool bit to just one of the tool holder and the tool mount adapter while the tool bit is inserted into the tool holder.

In another aspect, the method also includes preventing the tool mount adapter and the tool holder from concurrently locking to the tool bit.

In another aspect, the method also includes locking the tool bit to at least one of the tool mount adapter and the tool holder at all times.

In another aspect, introducing fluid into the first section of the tool mount adapter and locking the tool bit to the tool comprises contacting the fluid against a piston of the tool mount adapter and thereby moving the piston and aligning a narrow portion of a tapered section of the piston with a ball bearing on the tool and forcing the ball bearing against the tool bit.

In another aspect, introducing the fluid into a second section of the tool mount adapter and unlocking the tool bit from the tool mount adapter comprises contacting the fluid against the piston and moving the piston and aligning a wider portion of the tapered section of the piston with the ball bearing on the tool.

In another aspect, the method also includes moving a flange on the piston between first and second ports on the tool mount adapter with the fluid being introduced into the tool mount adapter through the first port to lock the tool bit and the fluid being introduced through the second port to unlock the tool bit.

In another aspect, the method also includes sending signals from a remote control unit and locking and unlocking the tool bit from the tool mount adapter.

In another aspect, the method also includes locking the tool mount adapter to the tool bit while the tool bit is machining a workpiece.

In another aspect, the method also includes securing a housing of the tool mount adapter to the tool and preventing the housing from moving along the tool bit relative to the tool.

In another aspect, the method also includes inserting the tool bit into a rod that extends outward from the tool with the tool mount adapter being positioned at the rod.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

Figure 1:
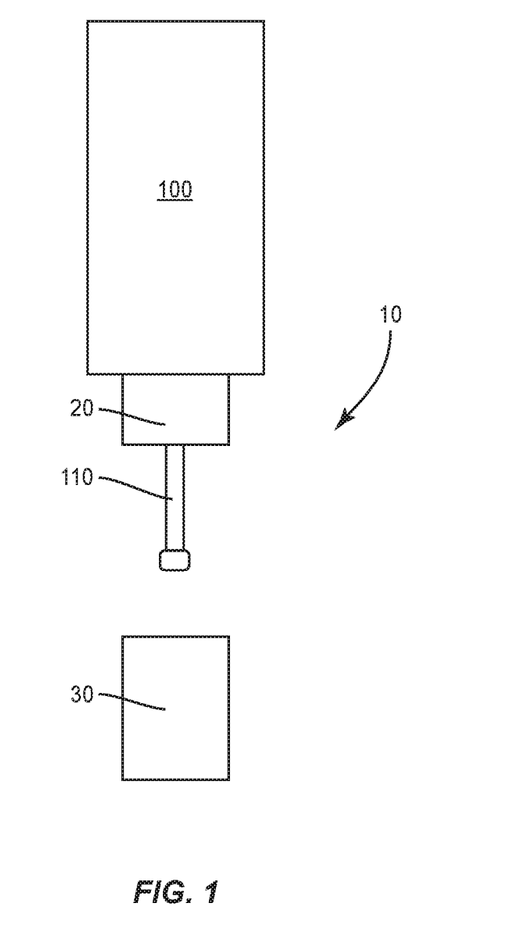
FIG. 1 is a schematic diagram of a tool changing system that includes a tool mount adapter and a tool holder.

FIG. 1 schematically illustrates a tool changing system 10 that includes a tool mount adapter 20 and a tool holder 30. The tool mount adapter 20 is configured to be attached to a tool 100 and selectively engage and disengage a tool bit 110. The tool 100 provides movement to the engaged tool bit 110 to perform work on a workpiece. The tool holder 30 is positioned in proximity to hold the tool bit 110 when not engaged by the tool 100. The tool holder 30 can also selectively engage and disengage the tool bit 110.

Figure 2:
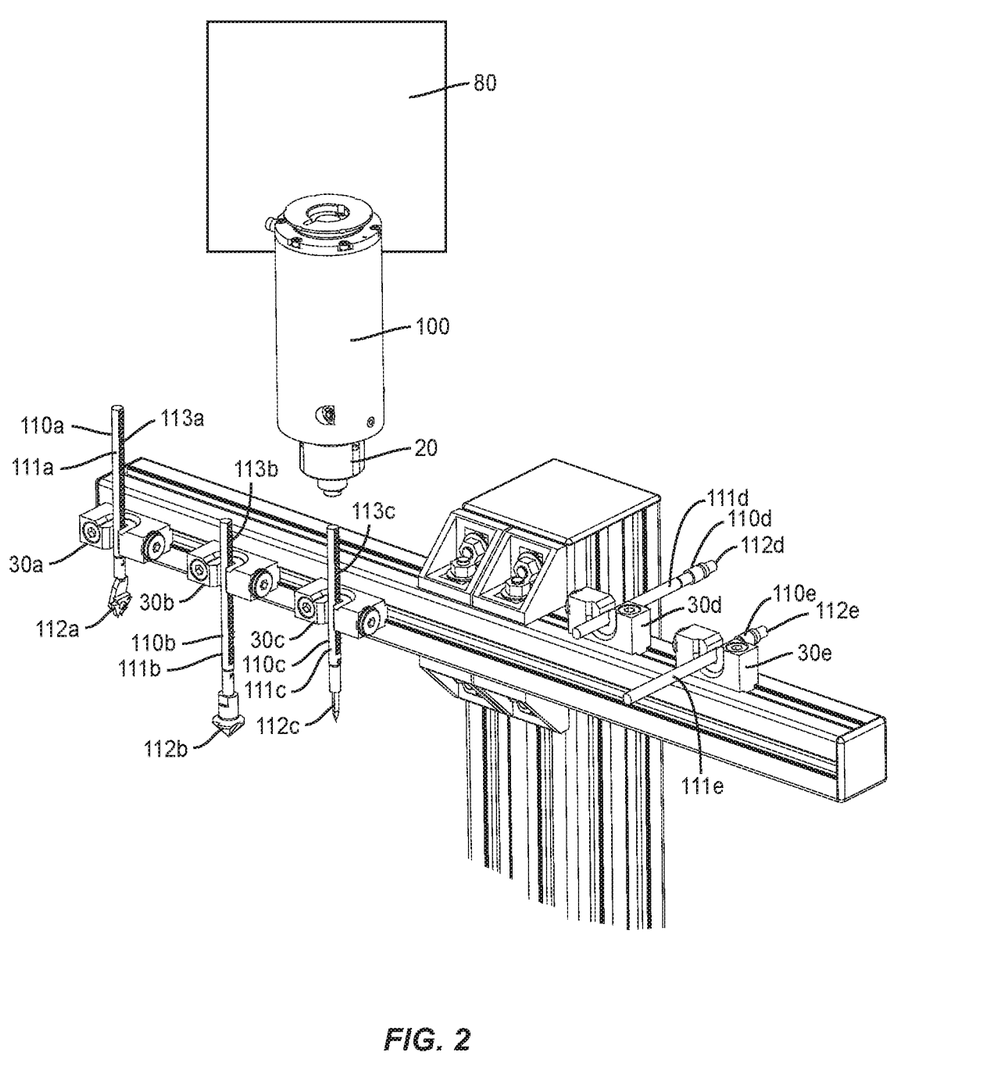
FIG. 2 is a perspective view of a tool mount adapter mounted to a tool and engaged with a tool bit and a plurality of tool holders each engaged with a tool bit.

FIG. 2 illustrates a tool mount adapter 20 connected to a tool 100. A robotic device (schematically illustrated as element 80) moves the tool 100 as necessary to perform the various work functions. Multiple tool holders 30a-30e are positioned in proximity and each is engaged with a tool bit 110a-e respectively. The tool 100 and tool mount adapter 20 can be moved by the robotic device 80 to the tool holder 30a-e that is engaged with the applicable tool bit 110a-110e. The selected tool bit 110a-110e is inserted into and engaged by the tool mount adapter 20. Once engaged by the tool mount adapter 20, the respective tool holder 110a-110e releases the corresponding tool bit 110a-110e which can then be moved by the robotic device 80 to perform work on a workpiece.

The tool mount adapter 20 can be mounted to a variety of different tools 100. Each of the tools 100 is configured to be operated through robotic control. The tools 100 can be automated and perform routine and repetitive tasks tirelessly, in hostile environments, and with high precision and repeatability. Such tasks include, for example, the deburring of the edges of machined or cast parts, or the related task of cutting away material from injection molded or blow-molded parts. These tools 100, when fitted with a robotic device 80, can perform a variety of different tasks including but not limited to grinding, filing, polishing, cutting, trimming, and similar finishing operations.

Figure 3:
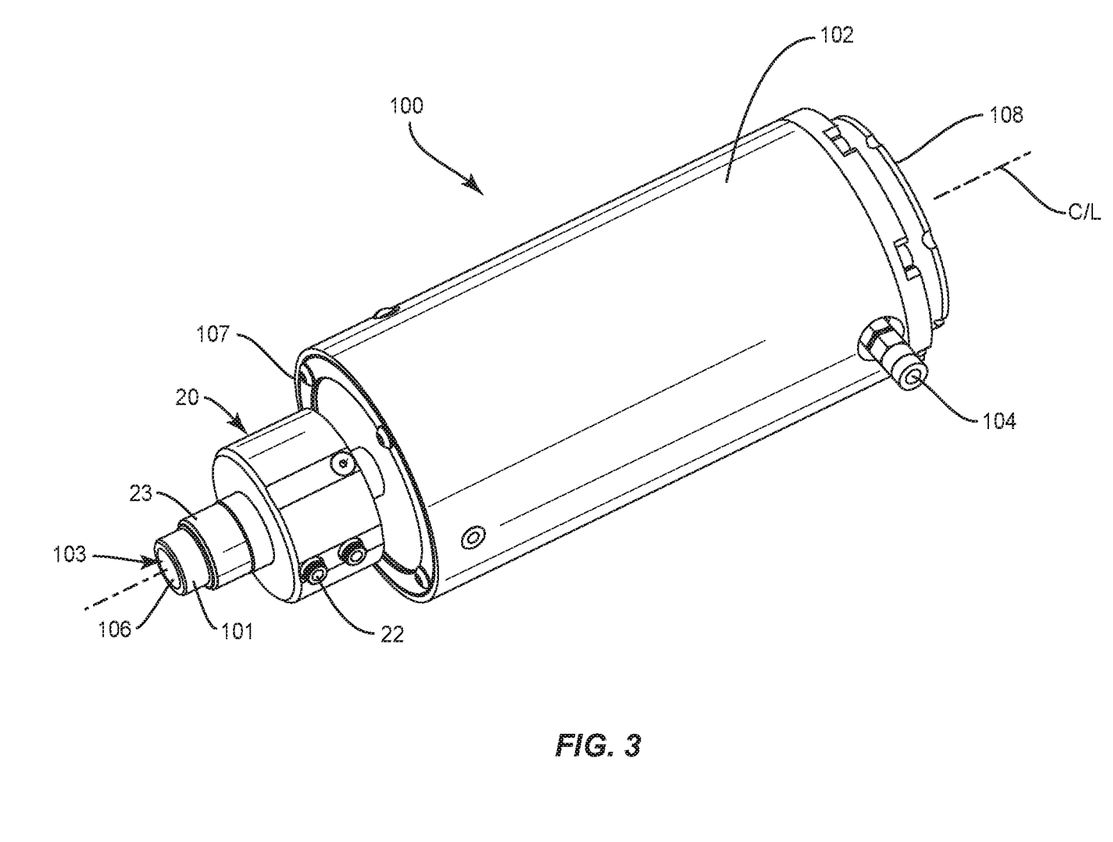
FIG. 3 is a perspective view of a tool mount adapter mounted to a tool.
Figure 5:
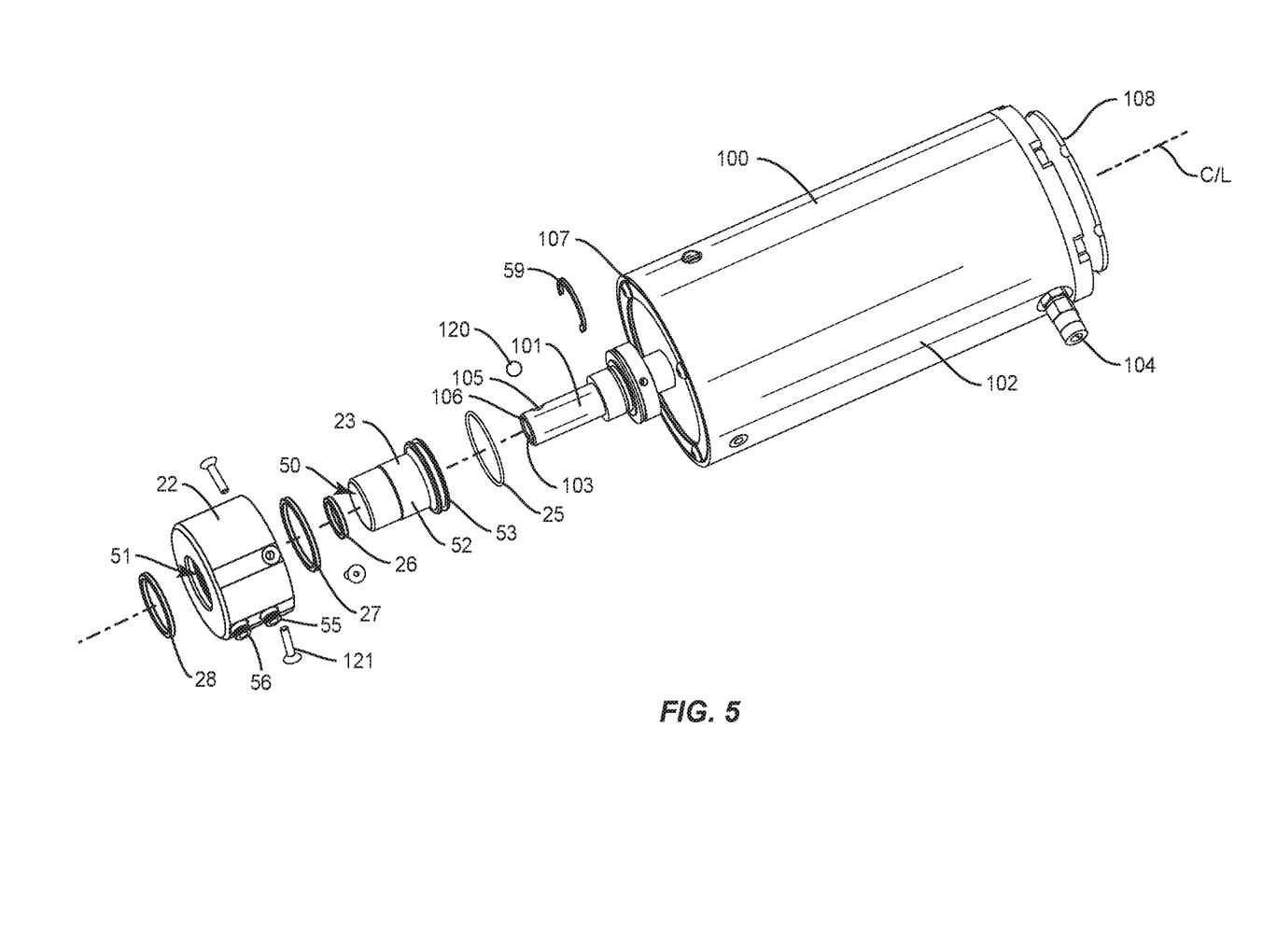
FIG. 5 is an exploded perspective view of a tool mount adapter and a tool.

As illustrated in FIG. 3, the tool 100 includes a main body 102 with a first end 107 and a second end 108. FIG. 3 includes a pneumatically powered tool 100 with a port 104 mounted on the body 102 to receive compressed fluid. An elongated rod 101 extends outward from the first end 107 and includes an open distal end 106. The end 106 includes a hollow interior space 103 sized to receive the tool bit 110. As illustrated in FIG. 5, an opening 105 extends through the rod 101 and into the hollow interior space 103 in proximity to the end 106. The opening 105 is sized to receive a ball bearing 120 to secure the tool bit 110 as will be explained in detail below.

As illustrated in FIG. 2, each of the tool bits 110 generally includes a shaft 111 and a working section 112 configured to contact with the workpiece and perform the designated function. The tool bits 110 can include a single unitary construction, or can be constructed from two or more sections that are attached together. In one example, the tool bits 110 are constructed with the shaft 111 being a separate section that is engaged with the working section 112. One example of a shaft 111 is a tool holder configured to receive the working section 112. One specific example is the SHAVIV line available from VARGUS of Nahariya, Israel that are configured to engage with various working sections 112, such as deburring blades and scrapers. Another example is tool holders available from Noga Engineering, Inc. of Shlomi, Israel configured to receive various working sections 112 such as blades, countersinks, scrapers, cutting and ceramic tools.

The shaft 111 can include teeth 113 that extend along the length. The teeth 113 can extend the entire length or a limited portion of the shaft 111. The shaft 111 can include various sectional shapes. Examples include but are not limited to circular, oblong, rectangular, and D-shape. In one example, the shaft 111 includes a straight edge (e.g., cross section with a rectangular-shape or D-shape) with the teeth 113 positioned on the straight edge.

Figure 4:
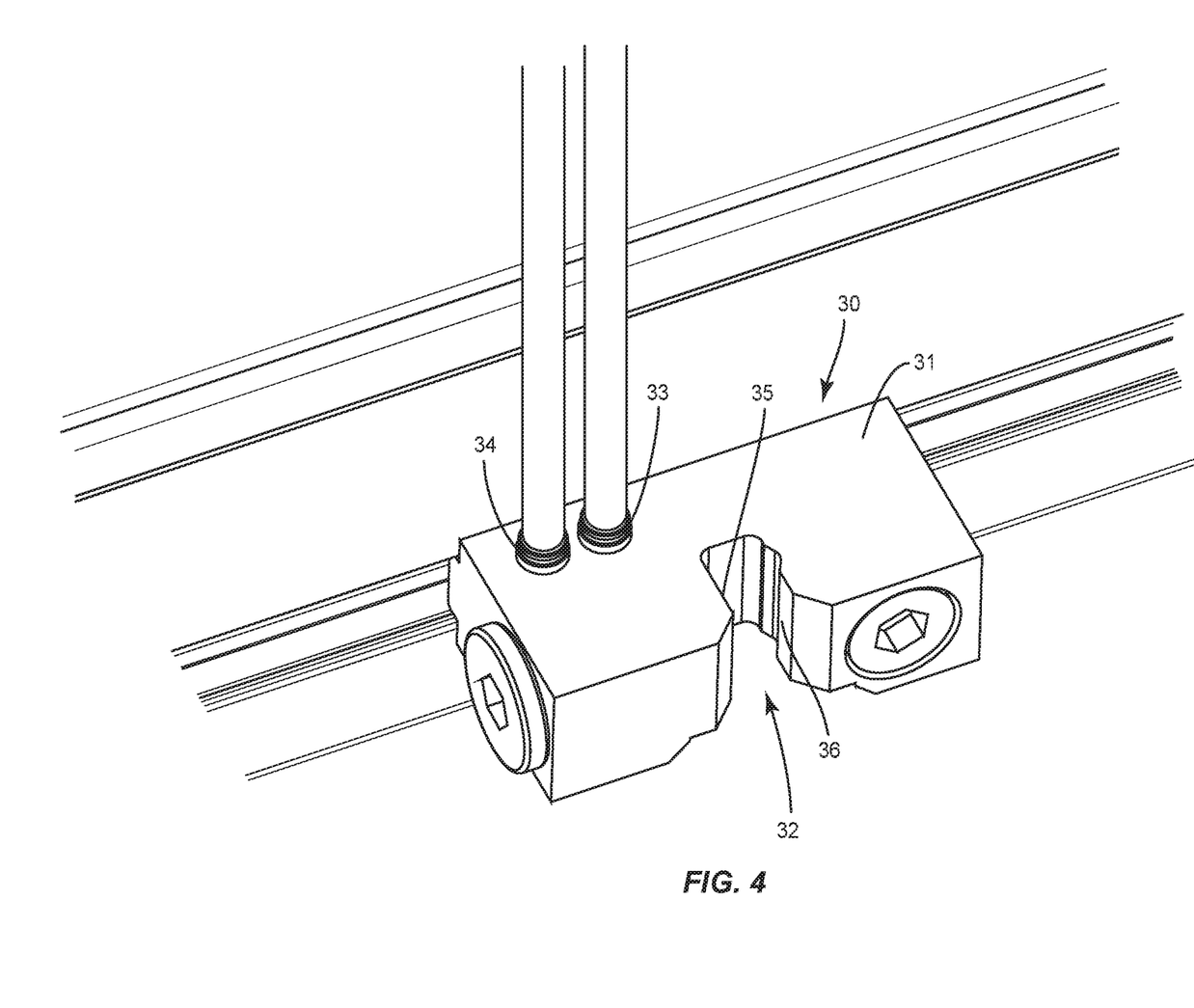
FIG. 4 is a perspective view of a tool holder.

FIG. 4 illustrates a tool holder 30 that engages and holds the tool bit 110 when not engaged by the tool mount adapter 20. The tool holder 30 includes a receptacle 32 sized to receive the tool bit 110. The receptacle 32 includes a wall 35 positioned on an opposing side from a piston 36. The receptacle 32 can include various shapes and sizes depending upon the shape and size of the tool bit 110. Ports 33, 34 provide for the movement of fluid to control the movement of the piston 36.

FIG. 5 illustrates an exploded view of the tool mount adapter 20 positioned at a tool 100. The tool mount adapter 20 includes an annular shape that extends around the rod 101 of the tool 100. The tool mount adapter 20 generally includes a piston 23 and a housing 22. The piston 23 includes a cylindrical body 52 with a flange 53 at a back end. A central opening 51 extends through the body 52 and is sized to receive the rod 101.

The housing 22 includes a central opening 51 that receives the body 52 of the piston 23. The opening 51 includes a diameter that is smaller than a diameter of the flange 53 of the piston 23. O-ring seals 25, 26, 27, 28 are positioned along the length of the tool mount adapter 20. A centerline C/L of the tool 100 extends through the rod 101. The tool mount adapter 20 is centered along the centerline C/L when mounted to the tool 100.

Figure 6:
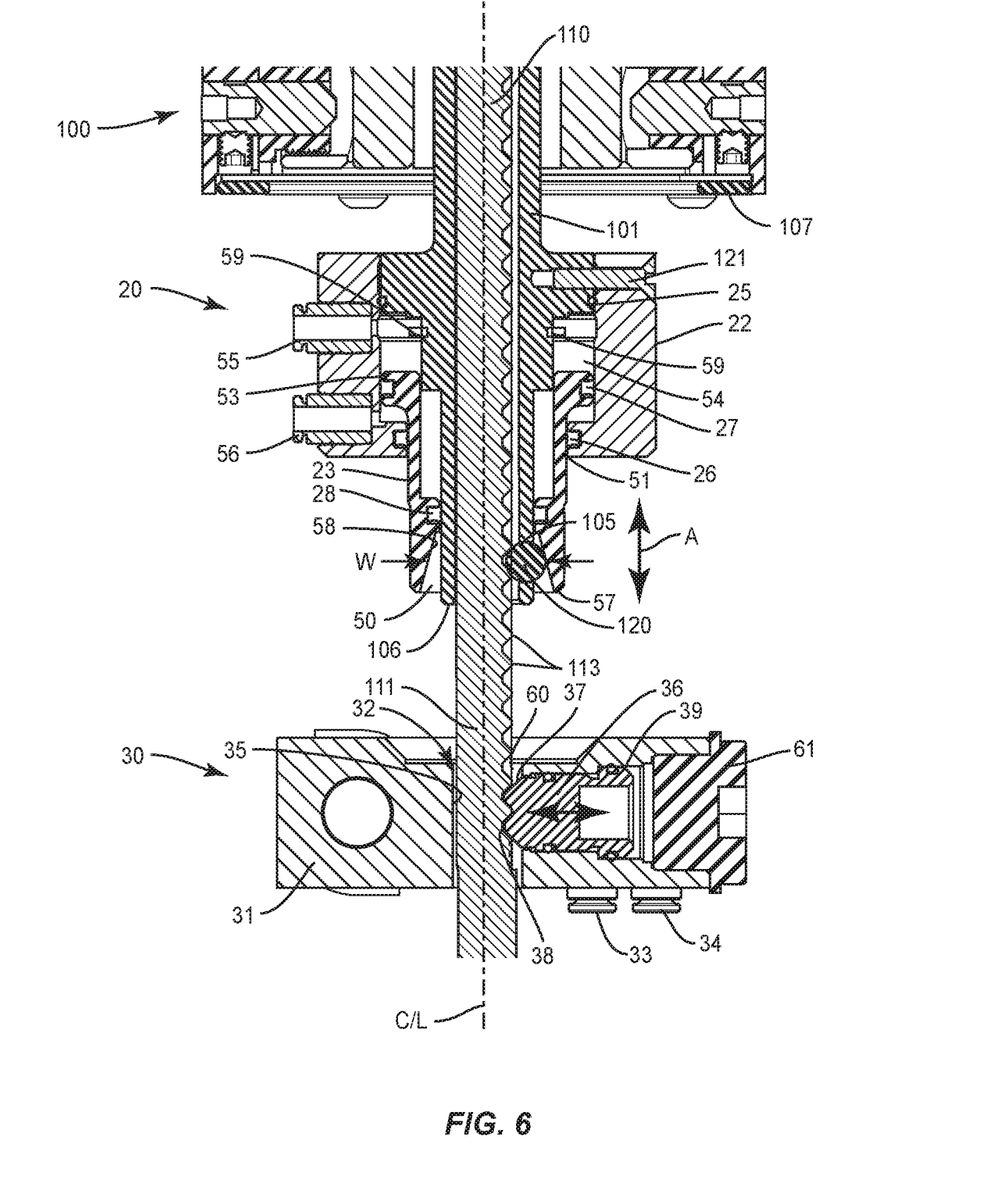
FIG. 6 is a section view of a tool bit engaged with a tool mount adapter and inserting into a tool holder.

FIG. 6 illustrates a section view of the tool mount adapter 20 and tool holder 30. A tool bit 110 is secured to the tool 100 by the tool mount adapter 20. The tool bit 110 is also inserted into the tool holder 30. As illustrated, the tool mount adapter 20 includes the housing 22 and the piston 23. The tool mount adapter 20 has an annular shape to extend around the rod 101 and the tool bit 110. A fastener 121 secures the housing 22 to the rod 101 of the tool 100.

A cavity 54 is formed within the interior of the housing 22 and is in communication with the opening 51. The piston 23 is positioned in the cavity 54 and extends outward through the opening 51. The flange 53 of the piston 23 is larger than the opening 51 thus preventing the piston 23 from escaping outward in a first direction through the opening 51. One or more contact members 59 extend radially outward from the rod 101 and into the cavity 54. The one or more contact members 59 provide a stop to limit the movement of the piston 23 within the cavity 54 in a second direction. In one example, the contact member 59 is a snap ring that is mounted in a slot in the rod 101. Ports 55, 56 extend through the housing 22 and into the cavity 54. The ports 55, 56 provide for pressurized fluid to be introduced into the different sections of the cavity 54 to control the movement of the piston 23 relative to the housing 22. In one example, a valve is positioned upstream from each of the ports 55, 56 to selectively introduce fluid into one of the ports 55, 56. The valve can also provide for venting fluid from the opposing port 55, 56.

The piston 23 is movable relative to the housing 22. During the movement, the flange 53 is positioned within the cavity 54 and a front edge 57 is positioned outward from the opening 51. The flange 53 is larger than the opening 51 thus preventing removal of the piston 23 through the opening 51.

The channel 50 extends through the piston 23 and is sized to receive the rod 101. A tapered section 58 is positioned along the channel 50. In one example as illustrated in FIG. 6, the tapered section 58 is positioned at the front edge 57. Other examples include the tapered section positioned at different locations along the length of the channel 50. In the example of FIG. 6, the tapered section 58 includes a tapered width that is wider at the front edge 57 and narrows inward away from the front edge 57. The width W of the channel 50 is measured perpendicular to the centerline C/L of the tool 100.

The tapered section 58 extends over the ball bearing 120 in the rod 101. During axial movement of the piston 23 indicated by arrow A, the tapered section 58 moves along the ball bearing 120. In a locked position as illustrated in FIG. 6, the piston 23 is moved outward in the first direction (i.e., towards the tool holder 30) with a relatively narrow section of the tapered section 58 positioned at the ball bearing 120. This positioning causes the ball bearing 120 to move radially inward towards the centerline C/L and engage with the teeth 113 on the tool bit 110. In an unlocked position, the piston 23 moves in a second direction (i.e., away from the tool holder 30) and into the housing 22. This positioning aligns a wider section of the tapered section 58 with the ball bearing 120. This positioning allows the ball bearing 120 to move radially outward and disengage from the teeth 113 of the tool bit 110.

The tool holder 30 is positioned to engage with and hold the tool bit 110. As illustrated in FIGS. 4 and 6, the tool holder 30 includes the receptacle 32 positioned within the body 31. The receptacle 32 is formed between the wall 35 of the body 31 and the piston 36. The body 31 includes a cavity 37 sized to hold the piston 36. The cavity 37 includes an opening 60 that leads into the receptacle 32. Ports 33, 34 extend through the body 31 to control a position of the piston 36 in the cavity 37. Ports 33, 34 provide for pressurized fluid to be introduced into the different sections of the cavity 37 to control the movement of the piston 36. In one example, a valve is positioned upstream from each of the ports 33, 34 to selectively introduce fluid into one of the ports and provide for venting fluid from the opposing port.

The piston 36 includes a front edge 38 that faces towards and is configured to contact against the shaft 111 of the tool bit 110. The front edge 38 can include an undulated shape that matches the teeth 113 that extend along the shaft 111 of the tool bit 110. The piston 36 can also include a flange 39 with a larger width than the opening 60 to prevent the piston 36 from moving through the opening 60 and into the receptacle 32. A plug 61 can be mounted in the rear of the cavity 37 to prevent the piston 36 from escaping through the rear of the cavity 37.

During use, one or both of the tool mount adapter 20 and tool holder 30 secure the tool bit 110. In the example of FIG. 6, both the tool mount adapter 20 and the tool holder 30 are engaged with the tool bit 110. To lock the tool mount adapter 20, fluid is introduced through the port 55 into the cavity 54. This fluid forces the piston 23 outward through the opening 51 to a locked position. The locked position includes a narrow section of the tapered section 58 of the piston 23 contacting against the ball bearing 120 and forcing the ball bearing 120 radially inward and into engagement with the shaft 111 of the tool bit 110. As illustrated in FIG. 6, this can include the ball bearing 120 being seated between adjacent teeth 113 of the tool bit 110.

To unlock the tool mount adapter 20, fluid is introduced into the cavity 54 through the second port 56. The fluid forces the piston 23 to move in the opposing direction inward through the opening 51. The extent of movement of the piston 23 in this direction is limited by the one or more contact members 59. In the unlocked position, a wider section of the tapered section 58 is aligned with the ball bearing 120. This allows for the ball bearing 120 to move radially outward away from the teeth 113 of the tool bit 110. Wth the ball bearing 120 away from the teeth 113, the tool bit 110 can be removed from the hollow interior 103 of the rod 101 of the tool 100.

The extent of axial movement of the piston 23 is limited to prevent escape of the ball bearing 120. The ball bearing 120 remains aligned along the tapered section 58. The tapered section 58 is sized to prevent the ball bearing 120 from moving radially outward beyond the opening 105 in the rod 101 and potentially escaping.

In the locked position, the second port 56 can be open to allow fluid in the cavity between the flange 53 and the opening 51 to exit from the cavity 54. In another example, the second port 56 remains closed in the locked position. Similarly, in the unlocked position the first port 55 can be open to allow fluid to exit through the first port 55.

The tool holder 30 works in a similar manner to move between locked and unlocked positions. To lock the tool holder 30, fluid is introduced in the port 34. This fluid causes the piston 36 to move towards and contact against the tool bit 110 that is positioned in the receptacle 32. This can include the undulating surface of the front edge 38 contacting against the teeth 113 on the tool bit 110. To unlock the tool holder 30, fluid is introduced through the port 33. This causes the piston 36 to move relative to the body 31 away from the receptacle 32 and out of contact with the tool bit 110. In the locked and unlocked positions, the opposing port 33, 34 can be opening to allow fluid to exit from the cavity 37.

Figure 7:
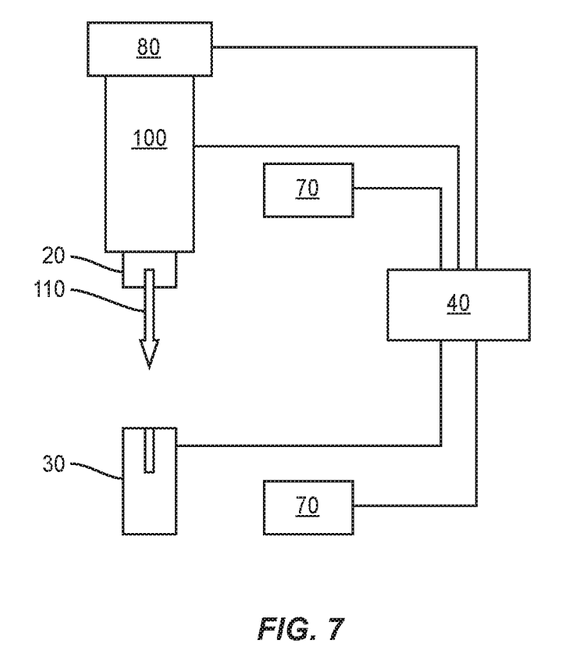
FIG. 7 is a schematic diagram of a control unit that controls the operation of a tool mount adapter and a tool holder.

As illustrated in FIG. 7, a control unit 40 can oversee the operation of the tool changing. The control unit 40 can signal control steps to one or more of the tool mount adapter 20, tool holder 30, fluid source 70, robotic device 80, and the tool 100. FIG. 7 illustrates the control unit 40 providing control for each of these components. Other examples can include the control unit 40 providing control for just the tool mount adapter 20 and the tool holder 30. The control unit 40 can be located at various locations, including remotely from these components, incorporated into the robotic device 80, and incorporated into the tool mount adapter 20.

Figure 8:
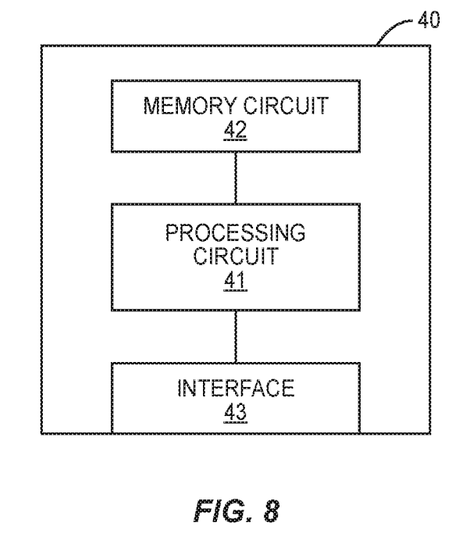
FIG. 8 is a schematic diagram of a control unit.

As illustrated in FIG. 8, the control unit 40 includes one or more processing circuits (shown as processing circuit 41) that can include one or more microprocessors, Application Specific Integrated Circuits (ASICs), or the like, configured with appropriate software and/or firmware. A computer readable storage medium (shown as memory circuit 42) stores data and computer readable program code that configures the processing circuit 41 to implement the techniques described above. Memory circuit 42 is a non-transitory computer readable medium, and can include various memory devices such as random access memory, read-only memory, and flash memory.

An interface 43 is configured to communicate with the components. In one embodiment the interface 43 includes a transceiver configured to wirelessly communicate with the components. The interface 43 may also provide for hardwire connection with the components. The system interface 43 may also provide for the supply of power from a remote source.

The tool 100 is configured to be used with a variety of different robotic devices 80. Robotic devices 80 include but are not limited to industrial robots and related automated equipment such as Computer Numeric Controlled (CNC) machines. The robotic devices 80 can operate a tool 100 in a variety of different settings, including performing routine and repetitive tasks tirelessly, in hostile environments, and with high precision and repeatability.

Figure 9:
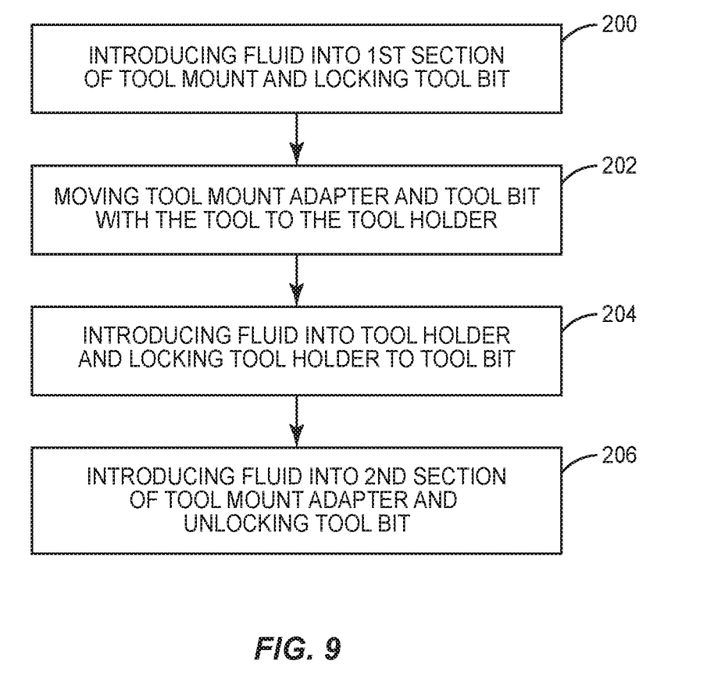
FIG. 9 is a flowchart diagram of a method of changing a tool bit from a robotically operated tool.

FIG. 9 illustrates a method of changing a tool bit 110 from a robotically operated tool 100. Fluid is introduced into a first section of the tool mount adapter 20 to lock the tool bit 110 to the tool 100 (block 200). In one example, this can include introducing fluid into port 55 and into the section of the cavity 54 behind the flange 53 of the piston 23. The fluid contacts against the piston 23 and moves the piston 23 outward through the opening 51 in the housing 22. This causes the tapered section 58 to move over the ball bearing 120 and align a narrow section of the tapered section 58 at the ball bearing 120. This results in the piston 23 forcing the ball bearing 120 radially inward and into engagement with the tool bit 110. Once in the locked position, the fluid can continue to be introduced into the port 55 to maintain the position. In another example, fluid is no longer introduced as the fluid already in the cavity 54 is adequate to maintain the position. In one example, port 56 is opened when fluid is being introduced through the port 55. This provides for fluid that is already in the cavity 54 between the flange 23 and the front of the cavity 54 to vent out thus allowing the piston 23 to move within the cavity 54 and along the rod 101.

With the tool mount adapter 20 in the locked position, the tool mount adapter 20 and the tool bit 110 are moved to the tool holder 30 and the tool bit 110 is inserted into the tool holder 30 while the tool bit 110 remains locked by the tool mount adapter 20 (block 202). The robotic device 80 which is attached to the tool 100 provides for the movement to the tool holder 30.

While the tool bit 110 is inserted into the tool holder 30, fluid is introduced into the tool holder 30 to lock the tool holder 30 to the tool bit 110 (block 204). In one example, this includes introducing fluid through port 34 and into the cavity 37 in the body 31 of the tool holder 30. The fluid contacts against the piston 36 causing the piston 36 to move within the cavity 37 and into contact with the tool bit 110 that is in the receptacle 32. In one example, the piston 37 moves through the opening 60 in the body 31 of the tool holder 30 and out into the receptacle 32 to contact against the tool bit 110. The tool bit 110 is compressed between the front edge 38 of the piston 36 and the wall 35 of the receptacle 32 that is positioned opposite from the piston 36. Once in the locked position, the fluid can continue to be introduced into the port 34 to maintain the position. In another example, fluid is no longer introduced as the fluid already in the cavity 37 maintains the position. In one example, port 33 is opened when fluid is being introduced through the port 34. This provides for fluid that is already in the cavity 37 in front of the flange 39 to exit thus allowing the piston 36 to move into contact with the tool bit 110.

The method also includes introducing fluid into a second section of the tool mount adapter 20 while introducing the fluid into the tool holder 30 and unlocking the tool mount adapter 20 from the tool bit 110 (block 206). In one example, this includes introducing fluid into the port 56 and into the cavity 54 in front of the flange 53 of the piston 23. The fluid forces the piston 23 to move within the cavity 54 in the opposing direction (e.g., back into the housing 50 as illustrated in FIG. 6). The extent of movement of the piston 23 in this opposite direction is limited by one or more contact members 59 that extend into the cavity 54 from the rod 101 and provide a stop for the piston 23. This movement of the piston 23 causes the tapered section 58 to slide over the ball bearing 120. A wider portion of the tapered section 58 is aligned with the ball bearing 120 in the unlocked position. The width of the tapered section 58 at this point provides for the ball bearing 120 to radially move away from the centerline C/L and out of engagement with the tool bit 110. The tapered section 58 remains aligned with the ball bearing 120 in the unlocked position. The width allows the ball bearing 120 to disengage from the tool bit 110, but prevents the ball bearing 120 from moving out of the opening 105 in the rod 101. Once disengaged, the tool bit 110 can be slid out of the rod 101.

Once in the unlocked position, the fluid can continue to be introduced into the port 56 to maintain the position. In another example, fluid is no longer introduced as the fluid already in the cavity 54 is adequate to maintain the position. In one example, port 55 is opened when fluid is being introduced through the port 56. This provides for fluid that is already in the cavity 54 behind the flange 23 to exit thus allowing the piston 23 to move within the cavity 54 and along the rod 101.

In one example, when the tool bit 110 is being transferred between the tool mount adapter 20 and the tool holder 30, just one of the tool mount adapter 20 and the tool holder 30 are locked to the tool bit 110. During the transfer, there is no time when both the tool mount adapter 20 and the tool holder 30 are unlocked from the tool bit 110.

In one example, the present disclosure is directed to a tool changing system 10 and methods that include the tool mount holder 20 and the tool holder 30.

In another example, the present disclosure is directed to just the tool mount adapter 20 and methods of use.

In another example, the present disclosure is directed to a tool 100, tool mount adapter 20, and the tool holder 30 and methods of use.

For simplicity and illustrative purposes, the present invention is described by referring mainly to an exemplary embodiment thereof. Numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A tool changing system for use with a robotically operated tool, the tool includes a rod with an open end that receives a tool bit, the tool changing system comprising:
    a tool mount adapter comprising:
        a housing;
        a first piston movably connected to the housing;
        a first cavity within the housing;
        a channel that extends through the first piston and is sized to receive the rod, the channel comprising a tapered section with a tapered width that extends along the rod;
    a tool holder comprising:
        a body with a receptacle;
        a second piston movably mounted to the body;
        a second cavity at the body;
    the first cavity comprising a first port and a second port,
    the second cavity comprising a first port and a second port,
    the tool mount adapter configured to be positioned between: (i) a tool mount adapter locked position to lock to the tool bit when fluid is introduced through the first port of the first cavity, and (ii) a tool mount adapter unlocked position to unlock from the tool bit when fluid is introduced through the second port of the first cavity,
    the tool holder configured to be positioned between: (a) a tool holder locked position to lock to the tool bit when fluid is introduced through the first port of the second cavity, and (b) a tool holder unlocked position to unlock from the tool bit when fluid is introduced through the second port of the second cavity.

2. The tool changing system of claim 1, further comprising a control unit with a processing circuit configured to position the tool mount adapter between the tool mount adapter locked position and the tool mount adapter unlocked position and to position the tool holder between the tool holder locked position and the tool holder unlocked position, the control unit further configured to position at least one of the tool mount adapter and the tool holder in the corresponding locked position at all times.

3. The tool changing system of claim 1, wherein the first piston comprises an annular shape configured to extend around the rod.

4. The tool changing system of claim 3, wherein the first piston comprises a flange that is positioned within the housing, the first piston further comprises a neck that extends through an opening in the housing, and wherein the tapered section is positioned along the neck.

5. The tool changing system of claim 4, wherein the first piston is movable relative to the housing and remains located relative to the housing with the flange between the first and second ports of the first cavity when the tool mount adapter is in both of the tool mount adapter locked position and the tool mount adapter unlocked position.

6. The tool changing system of claim 4, wherein the opening in the housing is smaller than a diameter of the flange.

7. The tool changing system of claim 1, wherein the tapered section is positioned at a front edge of the channel.

8. A tool changing system for use with a robotically operated tool, the tool includes a rod with an open end that receives a tool bit, the tool changing system comprising:
an annular tool mount adapter with an open interior that receives the rod, the tool mount adapter comprising:
a housing with a central opening that receives the rod, the housing further comprising a first port and a second port;
a first piston movably connected to the housing, the first piston comprising:
a body comprising a first end and a second end, the body extending through the central opening of the housing with the first end positioned within an interior of the housing and the second end positioned away from the interior of the housing, the body comprising a flange at the first end;
a channel that extends through the body and is sized to receive the rod, the channel comprising a tapered section with a tapered width;
the first piston movable relative to the housing between: (i) a first position at which the tool mount adapter is in a tool mount adapter locked position, and (ii) a second position at which the tool mount adapter is in a tool mount adapter unlocked position;
a tool holder comprising:
a receptacle; and
a second piston that is movable relative to the receptacle between: (a) a first position at which the tool holder is in a tool holder locked position, and (b) a second position at which the tool holder is in a tool holder unlocked position.

9. The tool changing system of claim 8, wherein the tool mount adapter is positioned in the tool mount adapter locked position to engage with a tool bit when fluid is introduced through the first port, and is positioned in the tool mount adapter unlocked position to release the tool bit when fluid is introduced through the second port.

10. The tool changing system of claim 9, further comprising a cavity formed within the housing with each of the first port and the second port extending through the housing and into the cavity.

11. The tool changing system of claim 8, further comprising a control unit with a processing circuit configured to position the tool mount adapter between the tool mount adapter locked position and the tool mount adapter unlocked position and position the tool holder between the tool holder locked position and the tool holder unlocked position, the control unit further configured to position at least one of the tool mount adapter and the tool holder in the corresponding locked position at all times.

12. The tool changing system of claim 8, wherein the tool holder further comprises a body with a cavity, the cavity sized to hold the second piston.

13. The tool changing system of claim 8, wherein the tool mount adapter comprises an annular shape configured to extend around the rod.

14. A tool changing system for use with a robotically operated tool, the tool includes a rod with an open end that receives a tool bit, the tool changing system comprising:
a tool mount adapter comprising:
a housing with a first port and a second port;
a first piston movably connected to the housing;
a first cavity within the housing:
a channel that extends through the first piston and is sized to receive the rod, the channel comprising a tapered section with a tapered width that extends along the rod:
a tool holder comprising:
a body with a receptacle, the body further comprising a first port and a second port;
a second piston movably mounted to the body;
the tool mount adapter configured to be positioned between: (i) a tool mount adapter locked position to lock to the tool bit when fluid is introduced into the first port in the housing, and (ii) a tool mount adapter unlocked position to unlock from the tool bit when fluid is introduced through the second port in the housing;
the tool holder configured to be positioned between: (a) a tool holder locked position to lock to the tool bit when fluid is introduced through the first port of the body, and (b) a tool holder unlocked position to unlock from the tool bit when fluid is introduced through the second port of the body.

15. The tool changing system of claim 14, further comprising a control unit with a processing circuit configured to position the tool mount adapter between the tool mount adapter locked position and the tool mount adapter unlocked position and to position the tool holder between the tool holder locked position and the tool holder unlocked position, the control unit further configured to position at least one of the tool mount adapter and the tool holder in the corresponding locked position at all times.

16. The tool changing system of claim 14, wherein the first piston comprises an annular shape configured to extend around the rod.

17. The tool changing system of claim 14, wherein the first piston further comprises a flange that is positioned within the housing, the first piston further comprises a neck that extends through an opening in the housing, and wherein the tapered section is positioned along the neck.

18. The tool changing system of claim 17, wherein the first piston is movable relative to the housing and remains with the flange located between the first and second ports of the first cavity when the tool mount adapter is in both of the tool mount adapter locked position and the tool mount adapter unlocked position.

19. The tool changing system of claim 17, wherein the opening in the housing is smaller than a diameter of the flange.

20. The tool changing system of claim 14, wherein the tapered section is positioned at a front edge of the channel.

* * * * *